United States Patent
Matsui et al.

[19]

[11] Patent Number: 6,091,445
[45] Date of Patent: Jul. 18, 2000

[54] FILM IMAGE INPUT DEVICE AND METHOD

[75] Inventors: Seiichi Matsui; Atsuhiko Ishihara, both of Asaka, Japan

[73] Assignee: Fuji Photo Film Co., Ltd., Kanagawa, Japan

[21] Appl. No.: 08/843,472

[22] Filed: Apr. 16, 1997

[30] Foreign Application Priority Data

Apr. 17, 1996 [JP] Japan .................................. 8-095208
Apr. 9, 1997 [JP] Japan .................................. 9-091041

[51] Int. Cl.$^7$ .................................................. H04N 5/253
[52] U.S. Cl. ................................ 348/96; 348/97; 358/518
[58] Field of Search ............................ 348/96, 97, 110, 348/251, 252, 215, 615; 358/76, 209, 527, 506, 519, 518, 487, 332, 54, 445; 386/127; 355/50; H04N 5/253

[56] References Cited

U.S. PATENT DOCUMENTS

| | | | |
|---|---|---|---|
| 4,766,503 | 8/1988 | Lambert et al. | 358/332 |
| 5,049,984 | 9/1991 | Moore, Jr. et al. | 358/54 |
| 5,049,985 | 9/1991 | Outa | 358/76 |
| 5,157,497 | 10/1992 | Topper et al. | 358/209 |
| 5,210,600 | 5/1993 | Hiata | 358/76 |
| 5,237,431 | 8/1993 | Imoto | 358/445 |
| 5,486,895 | 1/1996 | Leidig et al. | 355/50 |
| 5,592,218 | 1/1997 | Ochiai et al. | 348/110 |
| 5,623,303 | 4/1997 | Inoue et al. | 348/96 |
| 5,633,977 | 5/1997 | Inoue et al. | 386/127 |
| 5,739,924 | 4/1998 | Sano | 358/487 |
| 5,751,451 | 5/1998 | Ogoshi et al. | 358/527 |
| 5,815,291 | 9/1998 | Shono et al. | 358/504 |
| 5,872,643 | 2/1999 | Macda et al. | 358/518 |

FOREIGN PATENT DOCUMENTS

| | | |
|---|---|---|
| 2-3546 | 1/1990 | Japan . |
| 6-152953 | 5/1994 | Japan . |

*Primary Examiner*—Howard Britton
*Assistant Examiner*—Tung Vo

[57] ABSTRACT

Shading data are captured in a state where there is no developed film between a light source and a line sensor. During calibration, a negative base area on the film is positioned between the light source and the line sensor, and signal levels of colors of color signal data corresponding to three primary colors transmitted through the negative base area are controlled to be substantially equal. While the film is transported, the color signal data indicating a frame image are obtained in the calibrated state, and shading correction is performed for the color signal data according to the obtained shading data.

32 Claims, 6 Drawing Sheets

FILM IMAGE INPUT DEVICE AND METHOD

BACKGROUND OF THE INVENTION

1. Field of the Invention

The present invention relates to a film image input device and method, and more particularly to a film image input device and method suitable for a film scanner which illuminates developed color film and reads the transmitted image light by scanning it with a CCD line sensor.

2. Description of the Related Art

A film image input device such as a film scanner performs shading correction in order to eliminate the unevenness of pixels in an image sensor such as a charge coupled device (CCD), the unevenness of the quantity of light in a lamp for illuminating the film, a characteristic error in an optical system, or the like. In the conventional methods, a shading correction plate, which has the same color and transmission factor as a base area of the negative film, is inserted so as to obtain the shading correction data, or the shading correction data are obtained via a negative base area on the film (Japanese Patent Provisional Publication No. 6-152953).

In a conventional film scanner, if there are a plurality of film types that can be loaded in the scanner, a user inputs the type of a mounted film cartridge, or the scanner reads bar codes recorded on the film so as to identify the film type (Japanese Utility Model Provisional Publication No. 2-3546).

The method in which the shading correction plate is inserted, however, has a disadvantage because the operation is complicated. In the method in which the shading data are obtained via the negative base area on the film, the correct data cannot be obtained due to grain coarseness on the film if the determination is performed on only one point of the negative base area. Thus, a plurality of points covering a wide area of the negative base must be scanned to obtain the mean value. In the case of the film which does not have a wide negative base area or in which the density of the negative base differs with the part due to stains, in that case the correct data cannot be obtained.

Moreover, if the user sets the film type in advance, the operation becomes more complicated. The method in which the bar codes on the film are read has a disadvantage because the device is large in size and is more expensive.

SUMMARY OF THE INVENTION

In view of the foregoing, it is an object of the present invention to provide a film image input device and method which can easily obtain correct shading data regardless of the state of a negative base area on the film and which enables input of satisfactory image data.

It is another object of the present invention to provide a film image input device and method which enables a user to easily identify a film type and execute a processing suitable for the identified film type.

To achieve the above-stated objects, the present invention comprises the steps of: receiving illumination light emitted by a light source with a color line sensor in a state where there is no developed film, and converting the received light into color signals corresponding to quantity of the light by the color line sensor with three channels corresponding to three primary colors; amplifying, by amplifiers on a color-by-color basis, the color signals output from the color line sensor; obtaining, as shading data, color signal data digitized from the color signals by an A/D converter, the color signals corresponding to the three primary colors and being amplified by the amplifiers; positioning a negative base area on the film between the light source and the color line sensor, and executing calibration by controlling at least one of gain of the amplifiers or shutter speeds of electronic shutters provided on the color line sensor, the electronic shutters corresponding to the three primary colors, in order to substantially equalize levels of color signals of color signal data obtained via the color line sensor, the amplifiers and the A/D converter; and obtaining color signal data indicating a frame image in a calibrated state while the film is being transported, and performing shading correction for the color signal data according to the shading data.

According to another embodiment, the present invention comprises the steps of: receiving, with a black-and-white line sensor, illumination light of three primary colors sequentially emitted on a color-by-color basis by a color light source in a state where there is no developed film, and converting the received light into color signals corresponding to quantity of the light by the black-and-white line sensor; amplifying, by an amplifier on the color-by-color basis, the color signals output from the black-and-white line sensor; obtaining, as shading data, color signal data digitized from the color signals by an A/D converter, the color signals corresponding to the three primary colors and being amplified by the amplifier; positioning a negative base area on the film between the color light source and the black-and-white line sensor, and executing calibration by controlling at least one of gain of each color of the amplifier, quantity of light of each color received with the black-and-white line sensor, or a real accumulation time of the received light of each color in the black-and-white line sensor, in order to substantially equalize levels of color signals of color signal data obtained via the black-and-white line sensor, the amplifier and the A/D converter; and obtaining color signal data indicating a frame image in a calibrated state while the film is being transported, and performing shading correction for the color signal data according to the shading data.

That is, as stated above, the present invention has the following two combinations: the light source and the color line sensor, and the color light source and the black-and-white line sensor. In both combinations the shading data for shading correction are obtained in a state where there is no developed film between the light source and the line sensor. In order to execute the calibration, the negative base area on the film is positioned between the light source and the line sensor, and the color signal levels of the color signal data, which are obtained via the line sensor, the amplifier and the A/D converter, are substantially equalized on a color-by-color basis.

After the shading data are obtained, the frame image is captured while the shading correction is performed for the frame image according to the shading data. In this case, the film image is captured in a state where the gain of the amplifier is controlled so that the color signal levels of each color of the light transmitted through the negative base area on the film are substantially equal. That is, the film image is captured in a state where the level of each color signal is set so that a white balance of the light transmitted through the negative base can be maintained.

Thereby, the correct shading data can be obtained even if the quantity of the transmitted light and the color balance differ substantially according to whether there is film or not, and the satisfactory image data can be obtained.

Moreover, the color signal data are obtained multiple times per pixel, and the multiple color signal data are averaged. Thereby, the effects of the random noise can be reduced, so that the correct shading data can be obtained.

To achieve another object of the present invention, the present invention comprises the steps of: receiving illumination light emitted by a light source with a line sensor in a state where there is no developed film, and converting the received light into image signals corresponding to quantity of the light; amplifying the image signals output from the line sensor by an amplifier; obtaining image data digitized from the image signals by an A/D converter, when a base area outside a frame image recording area on the film is positioned between the light source and the line sensor; identifying a type of film in use among negative film, positive film and cleaning film based upon a signal level of the obtained image data; and executing a process according to the identified type of film.

That is, in the present invention, in view of the fact that the transmission factor of the base on the negative film is different from that of the base on the positive film and the cleaning film, the film type is identified according to the level of the color signals, which are obtained when the line sensor picks up the base area on the film. Thus, there is no need to provide a special device for identifying the film type. In addition, the processing is executed according to the identified film type, so that the user can easily operate the device.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 2(A) and 2(B) are views explaining a method for shading correction.

DETAILED DESCRIPTION OF THE PREFERRED EMBODIMENTS

Figure 1:
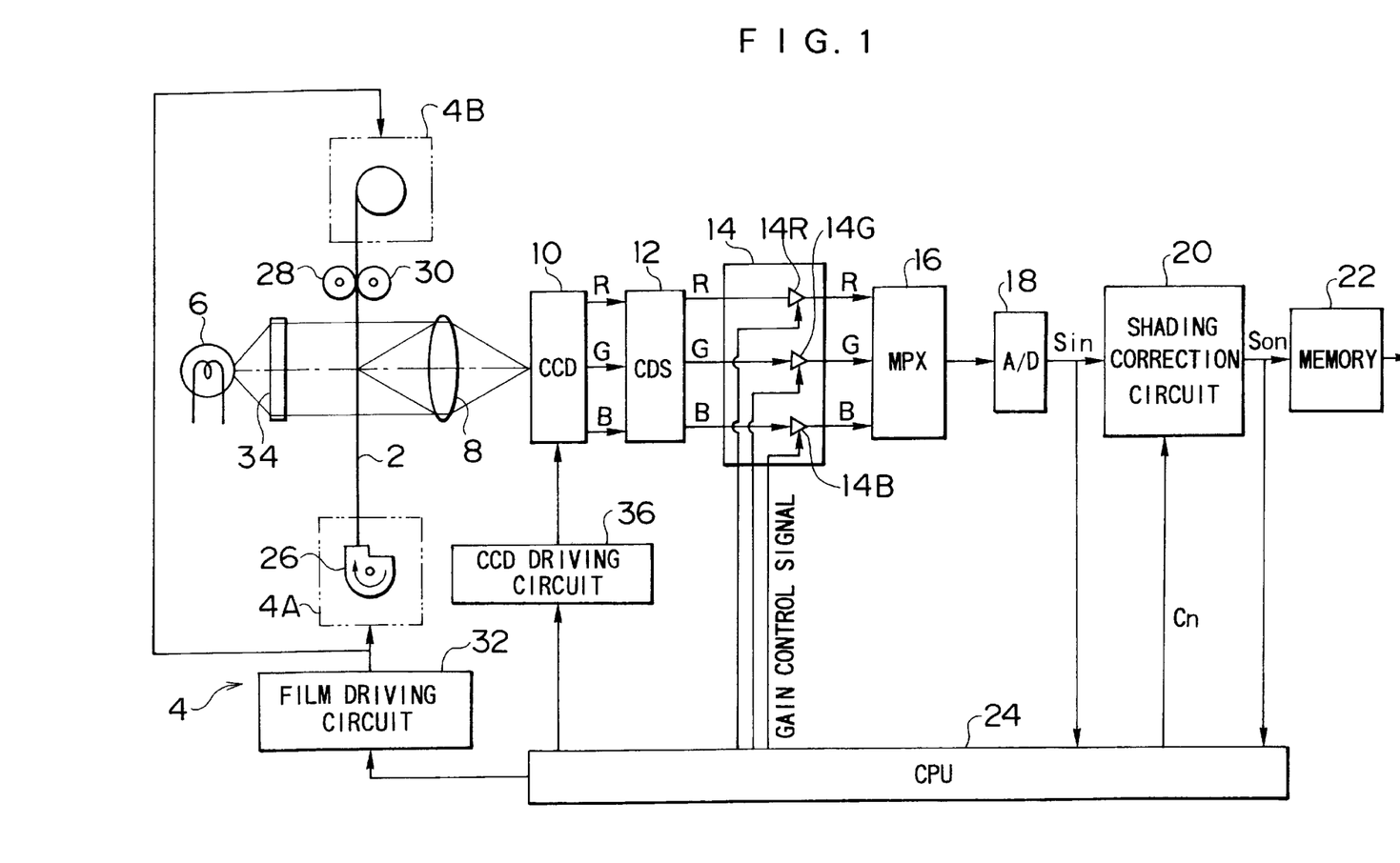
FIG. 1 is a block diagram illustrating the essential parts of a film scanner for an embodiment of the present invention.

FIG. 1 is a block diagram illustrating the essential parts of a film scanner according to the present invention. The film scanner consists of a film driving device 4 for transporting photographic film 2, a light source 6 for illumination, a taking lens 8, a CCD color line sensor 10, a CDS circuit 12, an analog amplifier 14, a multiplexer 16, an A/D converter 18, a shading correction circuit 20, an image memory 22, a central processing unit (CPU) 24, and so forth. The film scanner is provided with a magnetic data regenerating unit which includes a magnetic head (not shown). The film scanner is able to read magnetic data recorded on a magnetic recording layer on the photographic film 2, and record necessary data onto the magnetic recording layer.

The film driving device 4 comprises a film supply part 4A which couples to a spool of a film cartridge 26 and rotates the spool shaft forward and backward; a film takeup part 4B which takes up the photographic film 2 supplied from the film supply part 4A; a transporting means which is provided on a film passage and transports, at a constant speed, the photographic film 2 pinched between a capstan 28 driven by a motor (not shown) and a pinch roller 30; and a film driving circuit 32.

The film supply part 4A drives the spool shaft of the film cartridge 26 in a clockwise direction in the drawing, and supplies the photographic film 2 from the film cartridge 26 until the film takeup part 4B takes up the film leader. The CPU 24 controls a film transport speed of the film driving device 4. For example, during a pre-scanning for detecting the brightness of all frames on the photographic film 2, the film transport speed is controlled to be the first speed. During the main scanning for regenerating each frame image, the film transport speed is controlled to be the second speed which is lower than the first speed.

The light source 6 is a long fluorescent lamp which extends in a direction perpendicular to a film feed direction, and it illuminates the photographic film 2 through an infrared cutting filter 34. Image light transmitted through the film 2 is formed on a light accepting surface of the color line sensor 10 through a taking lens 8 which is a single-focus lens. While a frame image on the photographic film is being captured, the film driving device 4 moves the photographic film 2 forward or backward at a constant speed.

The color line sensor 10 is arranged in a direction perpendicular to the film feed direction. The image light formed on the light accepting surface of the color line sensor 10 is charge-accumulated in each photo-sensor which has a R (red), G (green) or B (blue) filter, and the image light is converted into R, G or B signal charge according to the quantity of the light. The signal charge, which is accumulated in the above-stated manner, is read to a shift register by a lead gate pulse of a predetermined cycle, which pulse is supplied from a CCD driving circuit 36, and the signal charge is sequentially read out by a register transfer pulse.

The color line sensor 10 is provided with a shutter gate and a shutter drain both of which are adjacent to each light accepting part, and the shutter gate pulse drives the shutter gate so as to sweep the accumulated charge in the light accepting part into the shutter drain. That is, the color line sensor 10 has a so-called electronic shutter function for controlling the accumulated charge in the light accepting part according to the shutter gate pulse supplied from the CCD driving circuit 36. The CPU 24 controls the CCD driving circuit 36 so that the shutter value of the color line sensor 10 can be controlled within the limits of 10%–100%.

The signal charge read out from the color line sensor 10 is separated by the CDS circuit 12, and then the signal charge is sent to amplifiers 14R, 14G and 14B of the analog amplifier 14. Gain of each channel of R, G and B of the analog amplifier 14 is controlled in accordance with a gain control signal from the CPU 24, and the amplifiers 14R, 14G and 14B of each color channel amplify the R, G and B signals according to the set gain. The gain control will be described later.

R, G and B signals output from the analog amplifier 14 are dot-sequentialized by the multiplexer 16, and the R, G and B signals are converted into digital signals by the A/D converter 18, and they are sent to the shading correction circuit 20.

The shading correction circuit 20 stores, in a shading memory, the shading data composed of the digitized R, G and B color signals, which are obtained when the color line sensor 10 receives the illumination light from the light source 6 in a state where there is no film. In this case, data relating to initial values (values of a head pixel) and differences between values of adjacent pixels for R, G and B signals are stored in the memory.

The CPU 24 finds shading correction data for compensating the unevenness of pixels, etc. based on the shading data contained in the shading memory, and stores the shading correction data into a memory. After finding the shading correction data, the CPU 24 obtains image signals while performing the shading correction for R, G and B signals for each pixel.

The image signals are negative-positive inverted, gamma-corrected, and the like by a signal processing circuit (not shown), and then the image signals are stored in an image memory 22. The R, G and B digital signals of one frame stored in the image memory 22 are repeatedly read out, and they are converted into analog form by a D/A converter (not shown). Thereafter, the image signals are converted into NTSC composite video signals by an encoder, and they are output to a monitor display. Thereby, the film images can be confirmed on the monitor display.

An explanation will hereunder be given about the shading correction with reference to FIG. 2.

Figure 2A:
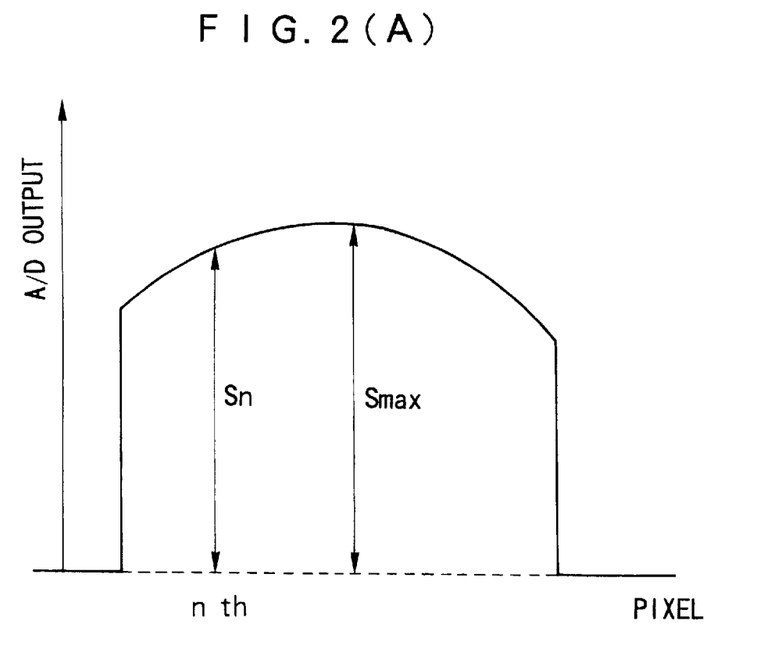
FIG. 2(A) is a view illustrating an example of shading data of one line.

FIG. 2(A) shows output data (shading data) after the A/D conversion of one line in one channel (G channel for example) among R, G and B signals, which are output when the illumination light from the light source 6 is picked up in a state where there is no film. The pixels of the greatest output exist in a proximity of the center of the sensor. The shading correction value $C_n$ of the n th pixel is given by the following equation:

$$C_n = S_{max}/S_n \quad (1)$$

where $S_{max}$ is the maximum output value, and $S_n$ is the n th shading data.

Thus, the data $S_{in}$ of the n th pixel before shading correction are multiplied by the correction value $C_n$ as indicated by the following equation, thereby, the data $S_{on}$ of the n th pixel after the shading correction can be found:

$$S_{on} = C_n \times S_{in} \quad (2)$$

Figure 2B:
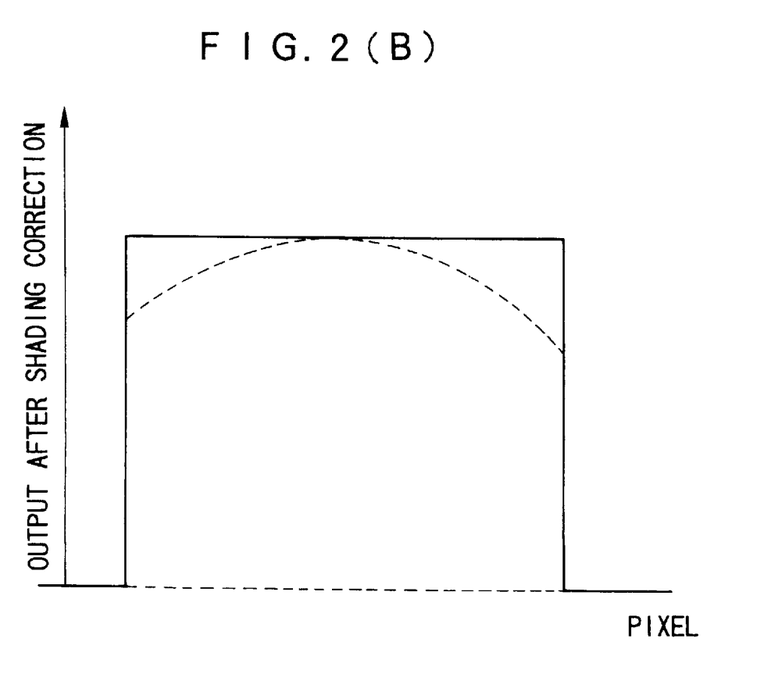
FIG. 2(B) is a view illustrating R, G and B signals of illumination light after the shading correction.

FIG. 2(B) shows the data which are obtained by performing the shading correction for R, G and B signals when the illumination light from the light source 6 is picked up in such a state where there is no film. As indicated in FIG. 2(B), the shading correction is executed for the image data, so that the unevenness of emission in the illumination, the unevenness of the shading in the lens, the unevenness of sensitivity of the line sensor, etc. can be eliminated, so that the satisfactory image data can be acquired.

Next, the gain control in the film scanner will be explained with reference to the flow chart of FIG. 3.

The power source of the film scanner is turned on to light the light source 6 (the fluorescent lamp), and the film cartridge 26 is mounted in the film scanner (STEP S101 (hereafter, only step numbers are indicated)). After the luminous intensity of the light source 6 is stabilized, an electronic shutter value and amplifier gain are set to a predetermined initial value in order to obtain the shading data (S102). In this case, the initial value of the amplifier gain is set so that the levels of color signals can be substantially equal in view of characteristics of emission spectrum of the illumination light.

The amplifier gain is preferably small in order to maintain a desired S/N ratio when the film image is captured. For this reason, in order that the R, G and B signal levels of the light transmitted through the negative base can be substantially equal at small gain of the amplifiers, the light source for illumination has such a spectral characteristic that blue emission energy is great. That is, the illumination light of the spectral characteristic is selected so that the levels of the color signals, which are obtained when the negative base is picked up, can be substantially equal when the amplifier gain of each color is equal.

Thus, if the illumination light is picked up in such a state that the amplifier gain of each color is equal in a state where there is no film, the R, G and B signal levels are substantially different. For this reason, the amplifier gain of each color is set so that the R, G and B signals of the illumination light can be substantially equal in a state where there is no film.

The amplifier gain may be set at a predetermined initial value, or the gain may be determined to be an optimum one according to the data which are obtained by picking up the illumination light several times while changing the gain.

In a state where there is no photographic film 2, the illumination light is picked up under the electronic shutter value and the amplifier gain which are set at S102 (S103). Then, the maximum level $L_{max1}$ among the R, G and B signals output from the color line sensor 10 is read (S104). The R, G and B signal levels are digitized by the A/D convertor 18, and the signal levels are read in the digitized values.

Next, the maximum level $L_{max1}$ obtained at S104 is compared with a predetermined first reference level $L_1$ (S105). If the difference between the $L_{max1}$ and the $L_1$ is not within a range of $\pm\alpha_1$, the electronic shutter value is changed (S106). Then, the process returns to S104 so that the illumination light can be picked up again.

If the difference is within $\pm\alpha_1$ at S105, the set electronic shutter value and amplifier gain are maintained and the shading data is obtained (S107). In this case, the shading data of one pixel is obtained by finding an arithmetic mean of the shading data which are obtained multiple times for the pixel, so that the effects of the random noise can be reduced.

After the shading data are obtained, the shading correction data of each pixel are obtained in the method explained in FIG. 2.

After the shading correction data are obtained, the film driving device 4 is driven to transport the photographic film 2, and the negative base area on the film is set at an image pickup position (S109). The negative base area is positioned, for example, before the first frame on the continuous photographic film 2, or before and after the reserved area provided before the first frame.

Thereafter, the electronic shutter value of the color line sensor 10 is set to the second initial value, which is predetermined for picking up the negative base (for calibration). The gain of each color of the analog amplifier 14 is set to an initial gain value, which is predetermined for picking up the negative base (S110). In this case, the set gain value is determined so that the color signal levels of the illumination light transmitted through the negative base on the photographic film 2 can be substantially equal. If the light source taking into consideration an orange mask of the negative film (a fluorescent lamp having such a spectral characteristic that the blue light emitting energy is great) is used, the gain of each color is substantially equal, and each color can be set at a low gain. Thereby the noise can be reduced.

The film base is picked up under the electronic shutter value and the amplifier gain which are set in S110 (S111).

The maximum level $L_{max2}$ is read among the R, G and B signals, which are output from the color line sensor 10 and digitized by the A/D convertor (S112). The maximum level $L_{max2}$ is compared with a predetermined second reference level $L_2$ (S113), and if the difference between the $L_{max2}$ and the $L_2$ is outside a range of $\pm\alpha_2$, the electronic shutter value is changed (S114), and the process returns to S111 so that the negative base can be picked up again.

If the difference is within $\pm\alpha_2$ at S113, the set electronic shutter value is maintained and the negative base is picked up again (S115). Then, signals levels $L_A$ and $L_B$ of two color channels except for a color channel whose the maximum level $L_{max2}$ has been detected are read (S116). It is determined whether the differences between the $L_A$ and the second reference level $L_2$ and between the $L_B$ and the $L_2$ are within the range of $\pm\alpha_2$ and the amplifier gain is changed so that the signal outside the range can be brought into the range (S118). Then, the process returns to S115 so that the negative base can be picked up again.

After the amplifier gain is adjusted so that the R, G an B signal levels which are obtained when the negative base is picked up can be brought into the range of $\pm\alpha_2$ with respect to the reference level $L_2$ in S110–S118, the scanning is executed in which the frame image on the film is picked up (S119).

In this embodiment, the gain of the amplifiers 14R, 14G, 14B of the color channels are controlled so as to substantially equalize the signal levels of the R, G, B signals. The present invention, however, should not be restricted to this. In the case of the color line sensor which is able to control the shutter value of the electronic shutter of each color channel, the shutter value of the electronic shutter of each color channel may be controlled to substantially equalize the signal levels of the R, G, B color signals.

Figure 4:
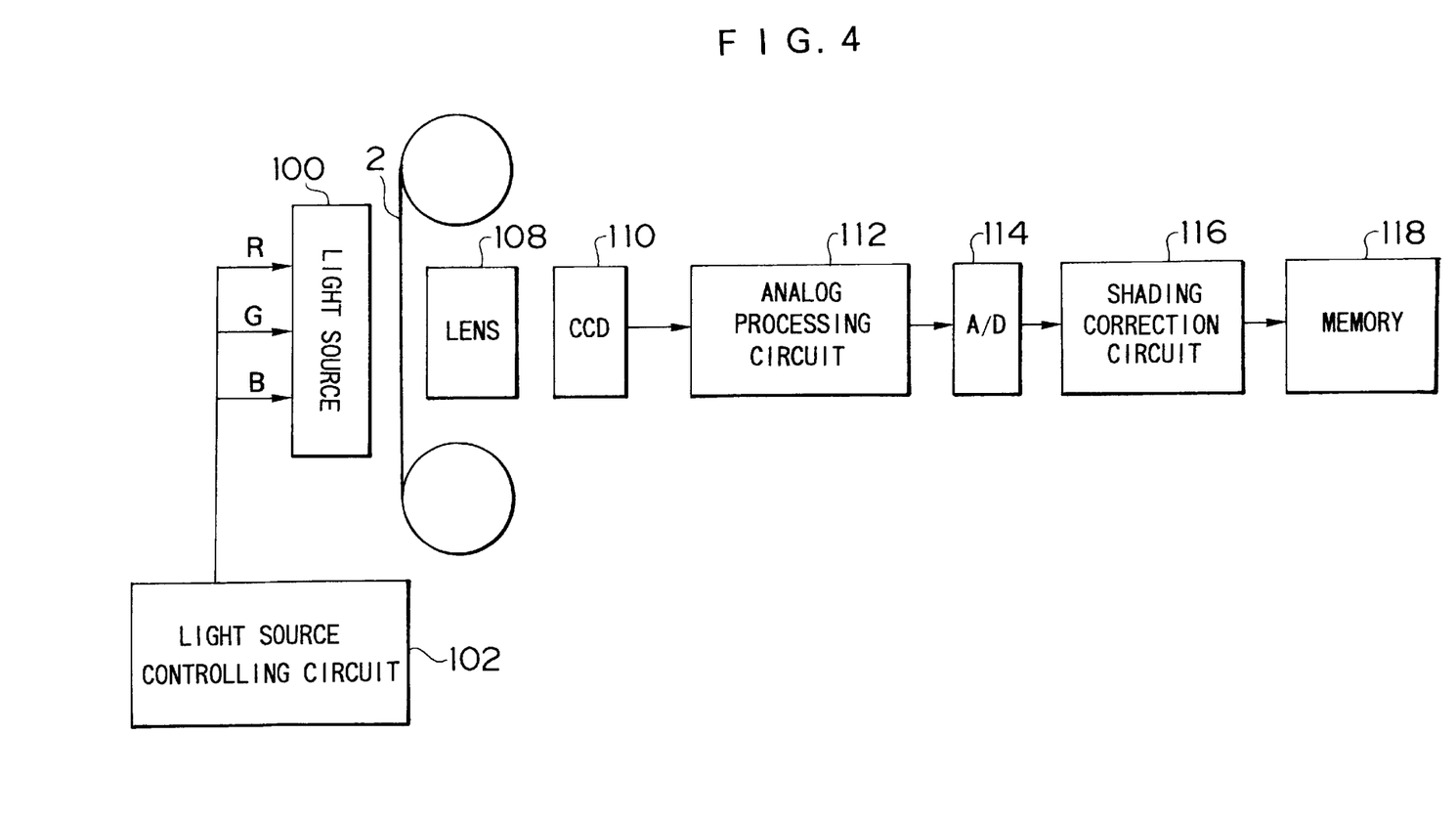
FIG. 4 is a block diagram illustrating the essential parts of the film scanner according to another embodiment of the present invention.

FIG. 4 is a block diagram illustrating the essential parts of another film scanner according to the present invention. This film scanner is different from the film scanner in FIG. 1 in that its light source 100 is comprised of light emitting diodes (LED) which emit R, G, B light and the intensity of light and lighting of each LED of R, G, B are controlled by a CPU (not shown) via a light source controlling circuit 102. A CCD line sensor 110 is a black-and-white line sensor.

The light source 100 selectively and sequentially emits R, G, B light when the black-and-white line sensor 110 reads image signals of one line. The R, G, B light are formed on the light accepting surface of the black-and-white line sensor 110 through the taking lens 108, or they are formed on the light accepting surface of the black-and-white line sensor 110 through the photographic film 2 and the taking lens 108.

The R light, which is formed on the light accepting surface of the black-and-white line sensor 110, is charge-accumulated in each sensor for a predetermined time, and the R light is converted into R signal charge according to the quantity of the R light. The R signal charge is sequentially read out as R color signal. Then, the readout R color signal is converted into R color signal data via the analog processing circuit 112 including the analog amplifier, etc. and the A/D converter 114. Thereafter, the R color signal data are sent to the shading correction circuit 116. Likewise, when the light source 100 emits the G light or the B light, the color signal data corresponding to the G light or the B light is sent to the shading correction circuit 116 via the black-and-white line sensor 110, the analog processing circuit 112 and the A/D converter 114.

The shading correction circuit 116 stores, in the shading memory, the shading data composed of digitized color signal data which is obtained when the black-and-white line sensor 110 receives the illumination light of an arbitrary one color (G light for example) from the light source 100 in such a state where there is no film. At that time, the initial value of the shading data (the value of the head pixel) and the data as to the differences between adjacent pixels are stored in the memory. In this case, at least one of the amplifier gain of the analog processing circuit 112, the quantity of light adjusted by the means (e.g. the intensity of luminescent light from the light source 100, the lighting time, the diaphragm, and the filter) for changing the quantity of light to the black-and-white line sensor 110, or the shutter speed of the mechanical or electronic shutter is controlled so that the shading data can be increased as much as possible within a range in which the black-and-white line sensor 110 is not saturated.

The CPU (not shown) finds the shading correction data for compensating the unevenness of the pixels, etc. based on the shading data captured in the shading memory, and stores the shading correction data into the memory.

When the film scanner performs the calibration, the light source 100 for example emits the R light, and the black-and-white line sensor 110 picks up the negative base area illuminated by the R light. Then, the intensity of the luminescent R light of the LED in the light source 100 is controlled via the light source controlling circuit 102 so that the output voltage of R output from the analog processing circuit 112 can be the reference voltage (2V for example).

Likewise, the light source 100 emits the G light and B light one after another, and the black-and-white line sensor 110 picks up the negative base area illuminated by the G and B light. Then, the intensity of luminescent G and B light of the LED in the light source 100 is controlled via the light source controlling circuit 102 so that the output voltages of G, B output from the analog processing circuit 112 can be the reference voltage.

As stated above, the calibration is performed in which the luminescent light of R, G, B is sequentially controlled, so that the color signal data of each color, which are sequentially obtained when the negative base area is captured, can be substantially equivalent to the data corresponding to the reference voltage.

In order to capture the frame image on the photographic film 2, while the photographic film 2 is transported, the light source 100 emits the R, G, B light in the calibrated state on a line-by-line basis, and the color signal data indicating the frame image on the photographic film 2 are sequentially obtained. Then, the color signal data are shading-corrected according to the previously-stored shading correction data, and the color signal data are negative/positive-inverted, gamma-corrected, and the like. Thereafter, the color signal data are stored in the image memory 118. The R, G, B digital signals of one line stored in the image memory 118 are repeatedly read out and converted into analog form by the D/A converter (not shown). Then, the R, G, B analog signals are converted into NTSC composite video signal by the encoder, and they are output to the monitor display. Thereby, the film image can be confirmed on the monitor display.

In this embodiment, the calibration is performed by controlling the intensity of R, G, B light emitted by the light source 100; however, the present invention should not restricted to this. The calibration may be performed by controlling at least one of the lighting time of R, G, B light emitted by the light source 100, the diaphragm value of R, G, B light, the filter, the shutter speed of the mechanical or electronic shutter, or the amplifier gain of the analog processing circuit 112.

Figure 3:
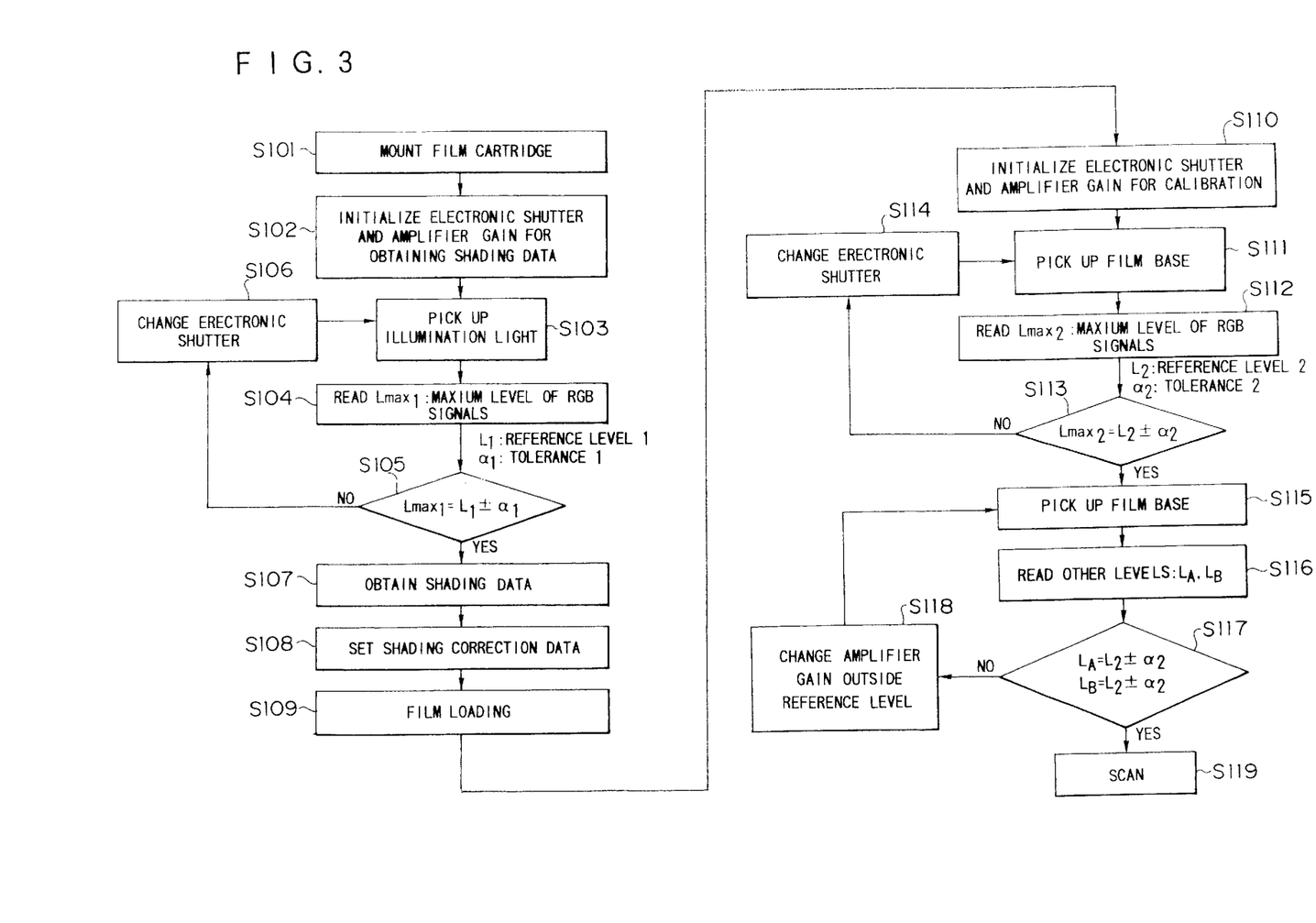
FIG. 3 is a flow chart showing a flow of the operation of the film scanner.
Figure 5:
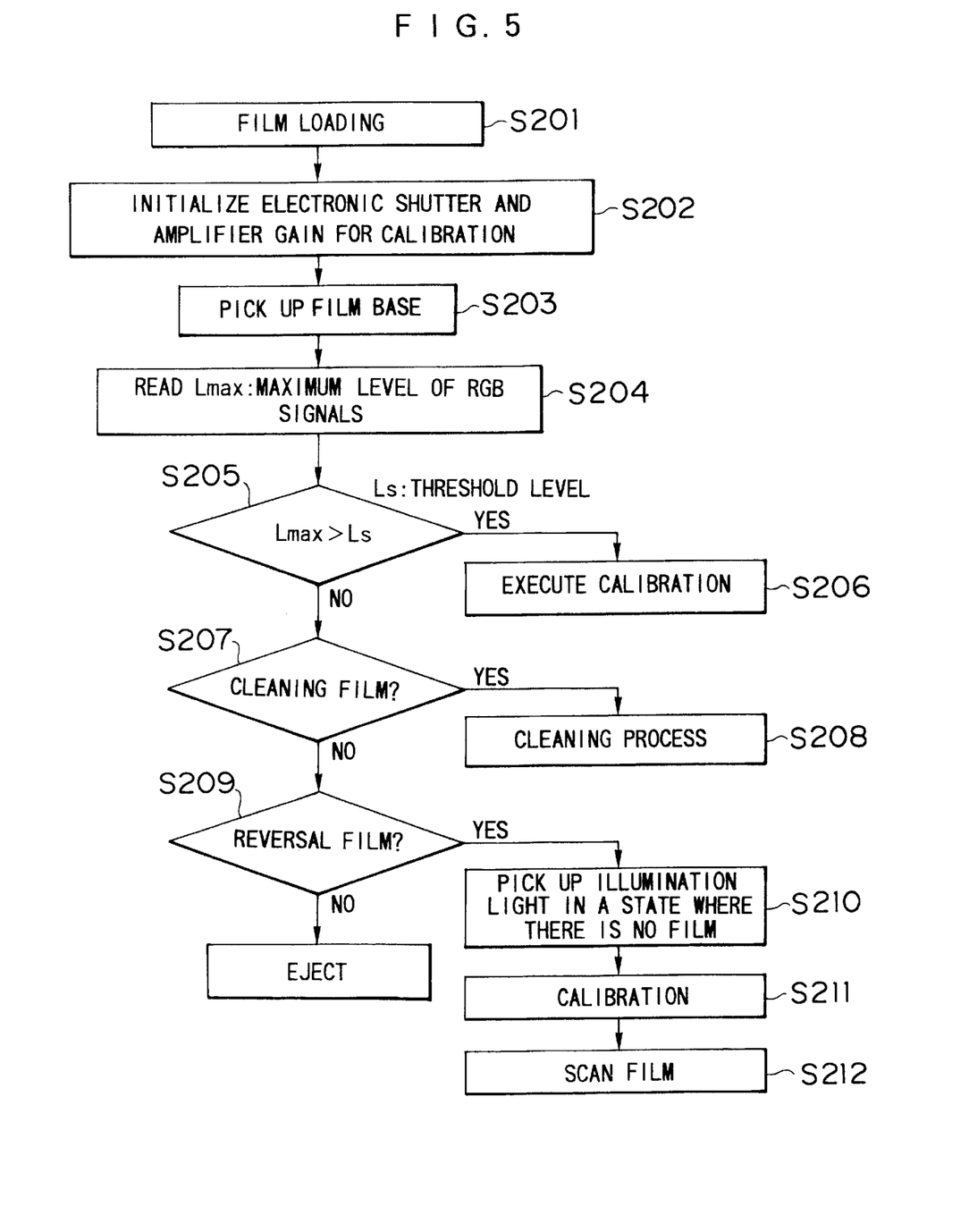
FIG. 5 is a flow chart showing a process of identifying a film type.

FIG. 5 is a flow chart showing the case where a processing step is added in order to recognize a film type when the film base is picked up as shown in FIG. 3. For example, developed negative film, developed positive film (reversal film) or cleaning film can be mounted in the film scanner. A transmission factor of the base on the film varies according to the film type, and the transmission factor on the cleaning film and the reversal film is much smaller than that of the base on the negative film. For this reason, the R, G and B signal levels, which are found through the reversal film and the cleaning film, are extremely smaller than those obtained through the negative film, and it is difficult to perform the calibration as is the case with the negative film.

In view of the above-mentioned fact, the film type is recognized according to at least a level of one color signal among the R, G and B signals, which are obtained by picking up the film base. That is, the film is loaded (S201), and the electronic shutter value and the amplifier gains are set at a predetermined initial values (S202). Thereafter, the film base is picked up (S203). Then, the maximum level $L_{max}$ among the R, G and B signals is read (S204), and the maximum level $L_{max}$ is compared with a predetermined threshold level $L_s$ (S205). If $L_{max}$ is larger than $L_s$ at S205, it is determined that the negative film is mounted, and the calibration is executed by picking up the negative base as shown in FIG. 3 (S206). On the other hand, if $L_{max}$ is equal to or smaller than $L_s$ at S205, it is determined that the cleaning film or the reversal film is mounted, and then the process goes on to S207.

Characters such as "Cleaning Film? Y/N" are displayed on a monitor screen at S207 so as to inform the user that the cleaning film may be mounted and confirm whether the cleaning will be performed or not. If the user confirms that the cleaning film is mounted, the cleaning is executed for the film in reciprocating motion (S208).

If the scanner has a function of reading the reversal film, and when the user indicates that the cleaning process is not desired at S207, the characters such as "Reversal film? Y/N" are displayed on the monitor screen. Thereby it is confirmed whether the process suitable for the reversal film will be executed or not (S209).

In this case, if the user orders that the process suitable for the reversal film is executed, the illumination light is picked up while there is no film (S210), and the calibration is executed (S211). Thereafter, the film is scanned (S212). On the other hand, if the user indicates that the process suitable for the reversal film is not desired, the film is rewound and the cartridge is ejected (S214).

If the device is not provided with a function of reading the reversal film, and when the user indicates that the cleaning process is not desired at S207, the film is rewound and the cartridge is ejected.

Figure 6:
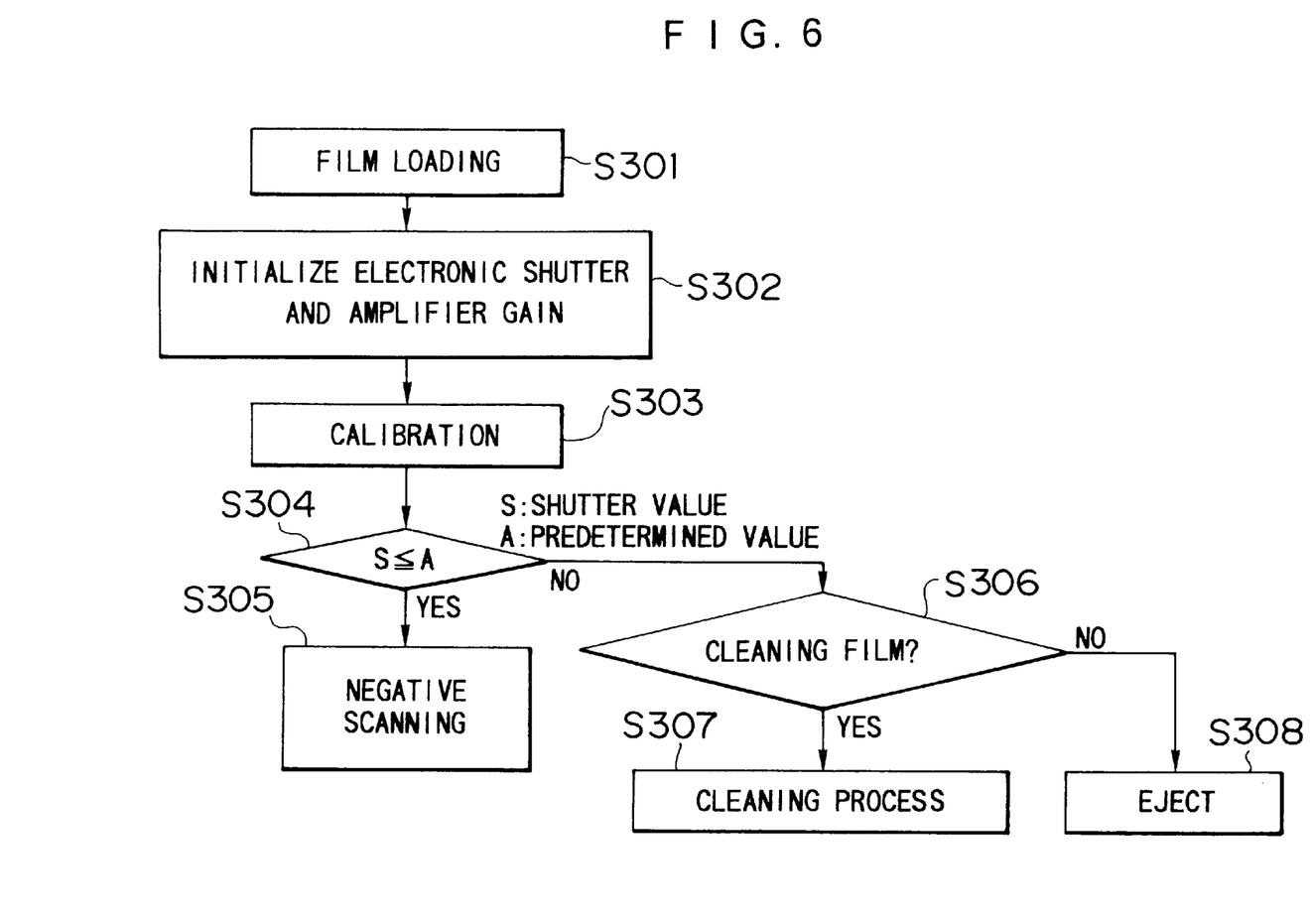
FIG. 6 is a flow chart showing another process of identifying a film type.

FIG. 6 is a flow chart showing another method of determining whether the loaded film is the negative film or the cleaning film.

The film is loaded (S301), and the electronic shutter value and the amplifier gain are set at predetermined initial values (S302). Then, the film base is picked up so that the calibration can be executed (S303). The electronic shutter value S to be changed is found according to the data composed of the R, G and B signals, which are obtained when the film base is picked up.

Since a transmission factor of the cleaning film is extremely small, the electronic shutter value, which is found according to the data composed of the R, G and B signals obtained via the cleaning film, is much larger than an electronic shutter value which is found according to the light transmitted through the base area on the negative film.

Accordingly, if the electronic shutter value S, which is found by picking up the film base, is equal to or smaller than a predetermined value A, the film is determined to be the negative film (S304), and the negative base is picked up as described in FIG. 3 (S305). On the other hand, if the electronic shutter value S is larger than the predetermined value A, the characters such as "Cleaning film? Y/N" are displayed on the monitor screen for example in order to warn the user of a possibility that the cleaning film is loaded and determine whether the cleaning process will be executed or not (S306).

If the user confirms that the cleaning film is loaded, the cleaning process is executed for the cleaning film in reciprocating motion (S307). If the user indicates that the cleaning process is not desired, the film is rewound and the cartridge is ejected (S308).

As stated above, the film type is identified according to the data relating to the pickup of the film base area, and thereby the operation performed by the user is not complicated and a plurality of film types can be handled. In addition, a special detecting means is not required for identifying the film type so that the costs can be lowered.

In the above-described embodiment, in order to process the signal, the signal is divided into the three primary colors of R, G and B; however, the present invention should not be restricted to this. The signal may be divided into the three primary colors of Y (yellow), M (magenta) and C (cyan) in order to process the signal.

As set forth hereinabove, according to the film image input method of the present invention, the shading data for the shading correction are obtained in a state where there is no film between the light source and the line sensor. During the calibration, the negative base area on the film is positioned between the light source and the line sensor, and the levels of the color signals, which are obtained via the line sensor, the analog amplifier and the A/D converter, are controlled to be substantially equal. Thereby, the correct shading data can be acquired even if the quantity of transmitted light and the color balance differs substantially according to whether there is the film or not, and the satisfactory image data can be obtained.

Moreover, the shading data of one pixel are obtained multiple times, and the multiple shading data are averaged. Thereby the effects of the random noise can be reduced, and the shading correction can be accurately performed.

Furthermore, according to the film image input device, the film type is identified according to the levels of the color signals which are obtained when the line sensor picks up the base area on the film. Thus, there is no need to provide a special device for identifying the film, and the costs can be lowered. In addition, the process is executed according to the identified film type, so that the operation performed by the user can be simplified.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. A film image input device comprising:
   a light source for illuminating developed film;
   film transporting means for transporting said film at a constant speed;
   a color line sensor for receiving light emitted by said light source and converting, on three channels corresponding to three primary colors, the received light into color signals corresponding to an intensity of said light, said color line sensor including photo-sensors arranged in a line in a direction perpendicular to a direction in which said film is transported by said film transporting means;

amplifiers for amplifying, on a color-by-color basis, said color signals output from said color line sensor;

an A/D converter for analog-to-digital converting said color signals amplified by said amplifiers into color signal data;

shading data obtaining means for obtaining, as shading data, color signal data digitized by said A/D converter in a first state without said film being present between the light source and the color line sensor;

control means for substantially equalizing levels of color signals of color signal data digitized by said A/D converter, in the first state and in a second state when a negative base area on said film is positioned between said light source and said color line sensor; and correcting means for performing shading correction of color signal data according to said shading data while said film transporting means is transporting said film, said color signal data indicating a frame image and being digitized by said A/D converter.

2. The film image input device as defined in claim 1, wherein said control means controls at least one of gain of said amplifiers or shutter speeds of electronic shutters provided on said color line sensor, said electronic shutters corresponding to the three primary colors.

3. The film image input device as defined in claim 1, wherein said shading data obtaining means obtains the shading data by finding an arithmetic mean of the color signal data obtained multiple times per pixel.

4. A film image input device comprising:

a color light source for illuminating developed film, said color light source being capable of selectively emitting light of each color of three primary colors;

film transporting means for transporting said film at a constant speed;

a black-and-white sensor for receiving light of the three primary colors selectively emitted by said color light source and converting the received light into color signals corresponding to an intensity of said light, said black-and-white line sensor including photo-sensors arranged in a line in a direction perpendicular to a direction in which said film is transported by said transporting means;

an amplifier for amplifying said color signals output from said black-and-white line sensor;

an A/D converter for analog-to-digital converting said color signals amplified by said amplifier into color signal data;

shading data obtaining means for obtaining, as shading data, color signal data of an arbitrary color among the three primary colors, said color signal data being digitized by said A/D converter in a first state without said film being present between the light source and the color line sensor;

control means for substantially equalizing levels of color signals of color signal data digitized by said A/D converter, in the first state and in a second state when a negative base area on said film is positioned between said light source and said black-and-white line sensors; and correcting means for performing shading correction of color signal data according to said shading data while said film transporting means is transporting said film, said color signal data indicting a frame image and being digitized by said A/D converter.

5. The film image input device as defined in claim 4, wherein said shading data obtaining means obtains the shading data by finding an arithmetic mean of the color signal data obtained multiple times per pixel.

6. The film image input device as defined in claim 4, wherein said control means controls at least one of means for changing the quantity of the light received with said black-and-white line sensor or a shutter speed of a shutter in order to increase the shading data as much as possible within a range wherein said black-and-white line sensor is not saturated, when the shading data is obtained in the state where there is no film.

7. The film image input device as defined in claim 4, wherein said control means substantially equalizes levels of the color signals by controlling at least one of gain of said amplifier, means for changing the quantity of the light received with said black-and-white line sensor or a shutter speed of a shutter, for light of each color of the three primary colors emitted by said color light source.

8. The film image input device as defined in claim 6 or 7, wherein said means for changing the quantity of the light received with said black-and-white line sensor is at least one of control means for controlling a lighting time of the light of each color in said color light source, control means for controlling intensity of the light of each color in said color light source, a diaphragm for controlling quantity of the light which is emitted by said color light source and transmitted through said diaphragm, or a filter for controlling the quantity of the light which is emitted by said color light source and transmitted through said filter.

9. A film image input device comprising:

a light source for illuminating developed film;

film transporting means for transporting said film at a constant speed;

a line sensor for receiving light emitted by said light source and converting the received light into image signals corresponding to an intensity of said light, said line sensor including photo-sensors linearly arranged in a direction perpendicular to another direction in which said film is transported by said transporting means;

an amplifier for amplifying said image signals outputted from said line sensor;

an A/D converter for analog-to-digital converting said image signals amplified by said amplifier into image data;

data obtaining means for obtaining image data digitized by said A/D converter, when an unexposed area outside a frame image recording area on said film is positioned between said light source and said line sensor;

film identifying means for identifying a type of film, in use among negative film, positive film and cleaning films based upon a signal level of the image data obtained by said data obtaining means; and control means for executing a process among a negative film process, a positive film process, and a film cleaning process according to the type of film identified by said film identifying means.

10. The film image input device as defined in claim 9, wherein said control means substantially equalizes levels of the color signals of the color signal data, when said film identifying means identifies negative film and the base area on said negative film is positioned between said light source and said line sensor.

11. The film image input device according to claim 9 wherein the light source is adapted to have difference spectral emission energy among the three primary colors.

12. A film image input method comprising the steps of:

receiving illumination light emitted by a light source with a color line sensor in a state where there is no developed film, and converting the received light into color signals corresponding to quantity of said light by said color line sensor with three channels corresponding to three primary colors;

amplifying, by amplifiers on a color-by-color basis, said color signals output from said color line sensor;

obtaining, as shading data, color signal data digitized from said color signals by an A/D converter, said color signals corresponding to the three primary colors and being amplified by said amplifiers;

positioning a negative base area on said film between said light source and said color line sensor, and executing calibration by controlling at least one of gain of said amplifiers or shutter speeds of electronic shutters provided on said color line sensor, said electronic shutters corresponding to the three primary colors, in order to substantially equalize levels of color signals of color signal data obtained via said color line sensor, said amplifiers and said A/D converter; and obtaining color signal data indicating a frame image in a calibrated state while said film is being transported, and performing shading correction for said color signal data according to said shading data.

13. The film image input method as defined in claim 12, further comprising the step of controlling at least one of the gain of said amplifiers or the shutter speeds of said electronic shutters when the shading data is obtained in the state where there is no film, in order to substantially equalize levels of the color signals of the color signal data obtained via said color line sensor, said amplifiers and said A/D converter.

14. The film image input method as defined in claim 12, wherein the shading data is obtained by finding an arithmetic mean of the color signal data obtained multiple times per pixel.

15. A film image input method comprising the steps of:

receiving, with a black-and-white line sensor, illumination light of three primary colors sequentially emitted on a color-by-color basis by a color light source in a state where there is no developed film, and converting the received light into color signals corresponding to quantity of said light by said black-and-white line sensor;

amplifying, by an amplifier on the color-by-color basis, said color signals output from said black-and-white line sensor;

obtaining, as shading data, color signal data digitized from said color signals by an A/D converter, said color signals corresponding to the three primary colors and being amplified by said amplifier;

positioning a negative base area on said film between said color light source and said black-and-white line sensor, and executing calibration by controlling at least one of gain of each color of said amplifier, quantity of light of each color received with said black-and-white line sensor, or a real accumulation time of the received light of each color in said black-and-white line sensor, in order to substantially equalize levels of color signals of color signal data obtained via said black-and-white line sensor, said amplifier and said A/D converter; and obtaining color signal data indicating a frame image in a calibrated state while said film is being transported, and performing shading correction for said color signal data according to said shading data.

16. The film image input method as defined in claim 15, further comprising the step of controlling at least one of means for changing the quantity of the light received with said black-and-white line sensor or a shutter speed of a shutter in order to increase the shading data as much as possible within a range wherein said black-and-white line sensor is not saturated, when the shading data is obtained in the state where there is no film.

17. The film image input method as defined in claim 15, wherein the shading data is obtained by finding an arithmetic mean of the color signal data obtained multiple times per pixel.

18. A film input method comprising the steps of:

receiving illumination light emitted by a light source with a line sensor in a first state, without said film being present between the light source and the color line sensor, and converting the received light into image signals corresponding to quantity of said light;

amplifying said image signals output from said line sensor by an amplifier;

obtaining image data digitized from said image signals by an A/D converter, in a second state when a base area outside a frame image recording area on said film is positioned between said light source and said line sensor;

identifying a type of film in use among negative film, positive film and cleaning film based upon a signal level of the obtained image data; and executing a process according to the identified type of film.

19. The film image input method as defined in claim 18, wherein levels of the color signals of the color signal data digitized by said A/D converter is controlled to be substantially equal, when negative film is identified as the type of film in use and the base area on said negative film is positioned between said light source and said line sensor.

20. The film image input device according to claim 1 wherein the light source is adapted to have difference spectral emission energy among the three primary colors.

21. The film image input device according to claim 1 wherein the light source has a greater blue emission energy than a red or green emission energy to facilitate greater equality among amplifier gains of said amplifiers for the three primary colors.

22. An imaging device for converting an image on a translucent film into representative electrical signals, the imaging device comprising:

a light source;

a photoelectric sensor for receiving light transmitted by the light source during a first state without the light passing through the translucent film or during a second state with the light passing through the translucent film and converting the received light into a plurality of color component signals;

amplifiers for individually amplifying the color component signals;

an analog-to-digital converter for analog-to-digital converting of said color component signals amplified by said amplifiers into color signal data;

a signal equalizer for substantially equalizing levels of the color signal data representing different color signal components during the first state and during the second state with light passing through a negative base area of the translucent film; and a controller for sampling the received light to obtain shading data during the first state and performing shading correction of the color signal data during the second state based on the shading data.

23. The imaging device according to claim 22 further comprising a film transporter for transporting the translucent film between the light source and photoelectric sensor.

24. The imaging device according to claim 22 wherein the photoelectric sensor comprises a linear arrangement of color sensors arranged perpendicularly to a direction of movement of the translucent film.

25. The imaging device according to claim 22 wherein the color component signals include a red channel, a blue channel, and a green channel.

26. The film imaging device according to claim 23 further comprising electronic shutters having variable shutter speeds controlled by the controller to impact a signal level of the color component signals.

27. The film imaging device according to claim 22 wherein the controller finds an arithmetic mean of the color signal data obtained multiple times per pixel to provide the shading data.

28. The imaging device according to claim 22 wherein the photoelectric sensor comprises a black-and-white sensor for sequentially receiving light of three primary colors selectively emitted by the light source, the black-and-white sensor sequentially converting the received light into the color component signals.

29. The imaging device according to claim 22 further comprising an identifier for identifying a type of the translucent film in use among a negative film, a positive film, and a cleaning film based upon levels of the color component signals during at least the second state.

30. The imaging device according to claim 22 further comprising an identifier for identifying a type of film among a translucent film and a cleaning film based upon levels of the color signal data.

31. The film image input device according to claim 22 wherein the light source is adapted to have difference spectral emission energy among three primary colors.

32. The film image input device according to claim 23 wherein the light source has a greater blue emission energy than a red or green emission energy to facilitate greater equality among amplifier gains of the amplifiers for the three primary colors.

* * * * *